UNITED STATES PATENT OFFICE.

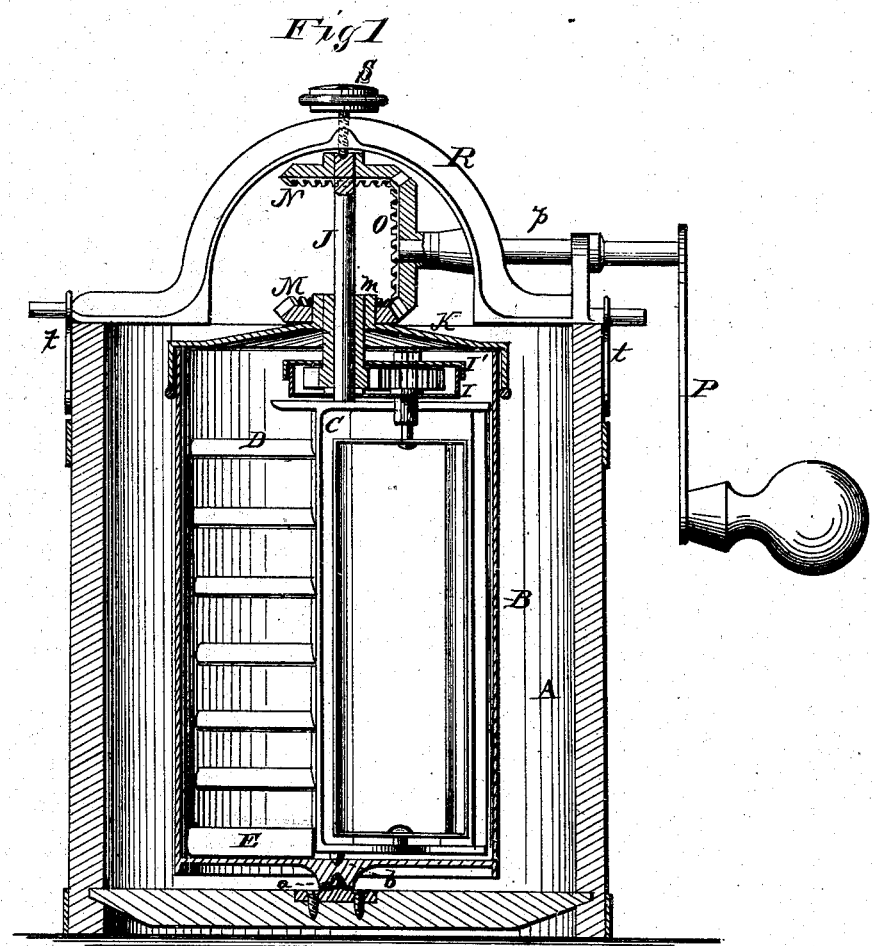

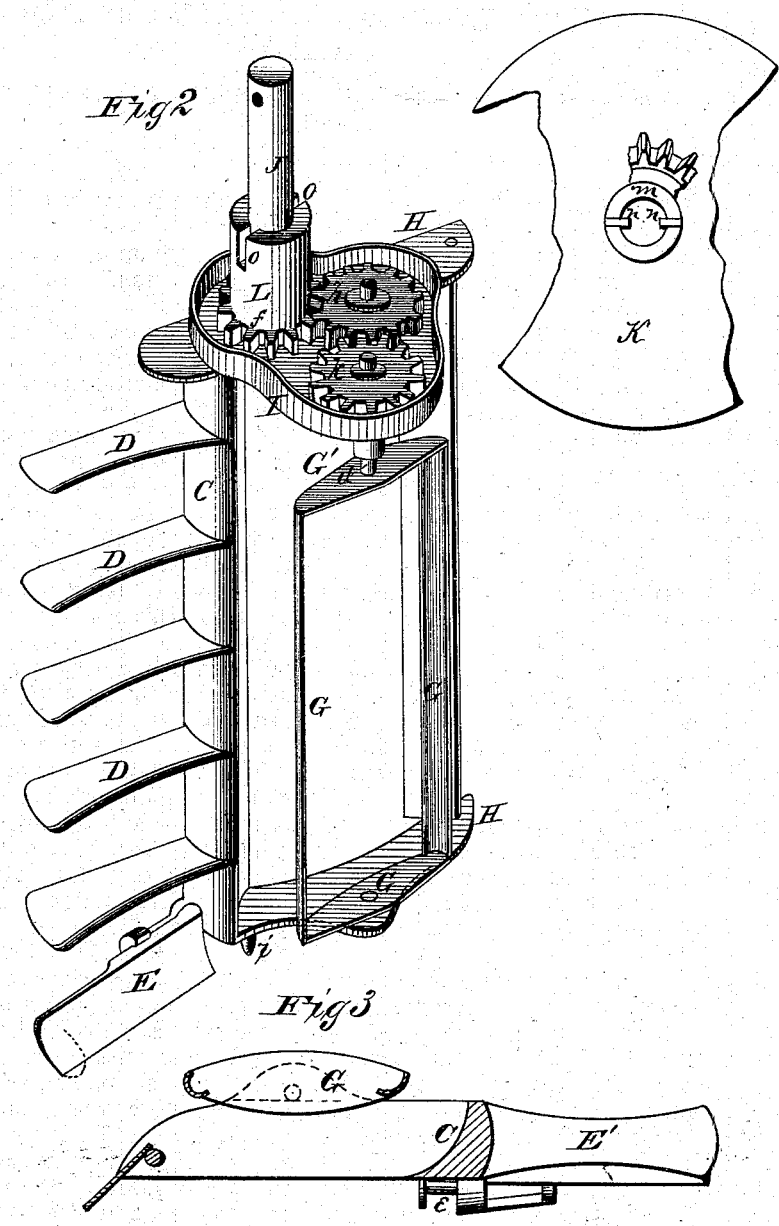

JOHN F. ROTE, OF READING, PENNSYLVANIA.

IMPROVEMENT IN ICE-CREAM FREEZERS.

Specification forming part of Letters Patent No. 186,438, dated January 23, 1877; application filed June 13, 1876.

*To all whom it may concern:*

Be it known that I, JOHN F. ROTE, of Reading, in the county of Berks and in the State of Pennsylvania, have invented certain new and useful Improvements in Ice-Cream Freezers; and do hereby declare that the following is a full, clear, and exact description thereof, reference being had to the accompanying drawings, and to the letters of reference marked thereon, making a part of this specification.

The nature of my invention consists in the construction and arrangement of an ice-cream freezer, as will be hereinafter more fully set forth.

In order to enable others skilled in the art to which my invention appertains to make and use the same, I will now proceed to describe its construction and operation, referring to the annexed drawings, in which—

Figure 1 is a vertical section of my ice-cream freezer. Fig. 2 is a perspective view of the beaters. Fig. 3 is a horizontal section of the same.

A represents the tub or bucket for the reception of the freezer. B is the vessel or freezer, provided on the under side of its bottom with a conical hub, $b$, resting upon a pivot, $a$, in the center, on the bottom of the tub A.

Within the freezer is arranged a compound beater, or a beater within a beater, constructed as follows: C is the main shaft of the beater, made in the form of a right-angle triangle, the hypotenuse of which is concave, as shown in Fig. 3. This shaft is on one side provided with a series of inclined arms or beaters, D D; and at the bottom, on the same side, it has a scraper, E, hung upon a pivot, $e$, at its inner end. The shaft C is further provided at top and bottom with a horizontal arm, H, extending in the opposite direction from the beaters.

The second or smaller beater is composed of two vertical concave blades, G G, connected at top and bottom by cross-bars G' G', and has its bottom bearing in an enlargement or projection on the lower arm H. From the top of the beater G G' extends a shaft or spindle, $d$, upward into a box, I, fastened on the top arm H.

The large or main beater rests on a pivot, $i$, at the bottom, while from its upper end extends a shaft, J, through the lid K of the freezer. The shaft C of the main beater is set on one side of the center of the can, so as to admit the second or smaller beater of one-half the width.

In operation the can or freezer B revolves in one direction, and the main beater revolves in the opposite direction, carrying the smaller beater with it. At the same time this smaller beater is independently rotated from the side to the center in the opposite direction to that of the large beater. The small beater serves to check the cream from being carried around by the larger beater, and causes a thorough agitation and circulation of the cream from side to center, and vice versa, by which an evenly frozen mass is obtained, and the formation of coarse particles entirely prevented.

The mechanism for operating the parts is as follows: The box I on the upper arm H surrounds the shaft J, and on said shaft is placed a hub, L, with pinion $f$ on its lower end. This pinion meshes with an idle pinion, $h$, and this, in turn, with a pinion, $k$, on the upper journal $d$ of the smaller beater. These gears are all within the box I, and are protected by a lid, I', so that no dirt or grease can get into the cream. The lid I' surrounds the hub L of the pinion $f$. The lid K of the can or freezer B is provided with a center collar, $m$, with inwardly-projecting ribs or feathers $n$ $n$, which enter slots $o$ $o$ in the upper end of the pinion-hub L, and the lid is connected to the can by any suitable fastening device. On the upper end of the shaft J is fastened a bevel-gear, N, and on the collar $m$ is fastened a similar gear, M. Into these gears mesh another gear, O, upon the inner end of a shaft, $p$, which has its bearings in a frame, R, and is at its outer end provided with a crank, P, for turning the same. The upper end of the shaft J is centered by a screw, S, as shown, in the center of the frame R. The frame R is arched, as shown, and provided with two arms, which are hinged to the tub A, so that the frame can be thrown out of the way. When the frame is down in place it is held by means of hooks t t.

Having thus fully described my invention, what I claim as new, and desire to secure by Letters Patent, is—

1. The combination, in an ice-cream freezer, of the upright shaft C, having inclined arms or beaters D D, and connected to the horizontal arms H H, and the small beater G G', all constructed substantially as and for the purposes herein set forth.

2. The combination of the large beater-shaft J, pinion f, with hub L, idle pinion h, and pinion k, on the journal of the smaller beater, the said pinions being inclosed within a box, I I', within the can, substantially as and for the purposes herein set forth.

In testimony that I claim the foregoing I have hereunto set my hand this 8th day of May, 1876.

JOHN F. ROTE.

Witnesses:
  GEORGE PRINTZ,
  EZEKIEL JONES.